United States Patent [19]

Seemuth

[11] Patent Number: 4,999,120

[45] Date of Patent: Mar. 12, 1991

[54] AQUEOUS EMULSION FINISH FOR SPANDEX FIBER TREATMENT COMPRISING A POLYDIMETHYL SILOXANE AND AN ETHOXYLATED LONG-CHAINED ALKANOL

[75] Inventor: Paul D. Seemuth, Greenville, N.C.

[73] Assignee: E. I. Du Pont de Nemours and Company, Wilmington, Del.

[21] Appl. No.: 484,971

[22] Filed: Feb. 26, 1990

[51] Int. Cl.$^5$ .............. D06M 15/53; D06M 15/643; D02J 3/18

[52] U.S. Cl. .................................. 252/8.6; 252/8.9; 252/174.15; 252/174.21; 428/365; 428/391

[58] Field of Search ............... 252/8.6, 8.9, 174.15, 252/174.21, 174.22; 428/391

[56] References Cited

U.S. PATENT DOCUMENTS

| | | | |
|---|---|---|---|
| 3,871,909 | 3/1975 | Aldrich | 252/8.8 |
| 4,337,166 | 6/1982 | Hill et al. | 252/DIG. 13 |
| 4,433,027 | 2/1984 | Deiner et al. | 427/387 |
| 4,620,878 | 11/1986 | Gee | 252/312 |

*Primary Examiner*—Paul Lieberman
*Assistant Examiner*—J. Darland

[57] ABSTRACT

An aqueous emulsion comprising a major amount of polydimethylsiloxane and a small amount of an ethoxylated long-chain alkyl alcohol provides an advantageous finish for spandex filaments.

6 Claims, No Drawings

AQUEOUS EMULSION FINISH FOR SPANDEX FIBER TREATMENT COMPRISING A POLYDIMETHYL SILOXANE AND AN ETHOXYLATED LONG-CHAINED ALKANOL

BACKGROUND OF THE INVENTION

1. Field of the Invention

This invention relates to a lubricating finish that is especially suited for spandex fibers. More particularly, the invention concerns such a finish comprising polydimethylsiloxane and an ethoxylated aliphatic alcohol, a method for preparing the finish and spandex fibers lubricated with the finish. The finish decreases the tackiness of spandex fiber.

2. Description of the Prior Art

Spandex filaments are very tacky compared to conventional textile filaments, such as those melt-spun from nylon or polyester polymers. Spandex filaments tend to stick to each other, especially when wound on a pirn, bobbin, cake or other such yarn package. Tackiness can manifest itself in fused filament segments and high yarn-to-yarn friction. Also, on being unwound from a yarn package, spandex filaments can experience excessive tension and large, rapid transient increases in tension, which in turn lead to many broken filaments during operations such as covering, knitting, weaving and the like. Further, because spandex filaments are subjected to higher compressive forces when they are located in the inner layers of a wound up yarn package, as compared to the compressive forces on the filaments in the outer layers, average tensions and numbers of tension transients can change significantly as the filaments are unwound from the yarn package. Such tension variations produce nonuniformities in fabrics made with spandex fiber supplied from such packages.

Various finishes have been suggested for lubricating the surfaces and reducing the tackiness of spandex filaments. A finish for spandex filaments, which has been used with considerable success in commercial operations, comprises by weight about 92 parts of polydimethylsiloxane, 4 parts of polyamylsiloxane and 4 parts magnesium stearate. Similar finishes are disclosed by Chandler, U.S. Pat. No. 3,296,063. The finishes can be applied to the spandex filaments by dipping, padding, spraying, finish rolls or by addition to spandex polymer spinning solution for simultaneous extrusion with the fiber-forming spandex polymer. The finishes usually amount to between about 2 and 8 percent of the weight of the filament to which they are applied.

Buster et al, U.S. Pat. No. 3,634,236, discloses a finish for use on spandex fibers. The finish comprises a solution of mineral oil and silicone oil (e.g., formed in part by polydimethylsiloxane, among others) and surfactant (e.g., an ethoxylated alkyl alcohol of 8 to 20 carbon atoms). However, mineral oil finishes often cause swelling of spandex fibers and are generally inferior to the commonly used commercial finish described in the the preceding paragraph.

An object of the present invention is to provide a surface finish for spandex fiber which decreases the tackiness of the fiber, provides satisfactory frictional characteristics to the fiber surface and thereby permits more efficient utilization of the fiber in yarn-covering and fabric-making operations.

SUMMARY OF THE INVENTION

The present invention provides an aqueous emulsion suitable as a finish for spandex fibers. The emulsion consists essentially of 50 to 95 weight percent water and 50 to 5 percent solids. The solids consist essentially of 80 to 99.5% polydimethylsiloxane and 20 to 0.5% of an ethoxylated alkyl alcohol. The alcohol has a number average molecular weight of at least 800, preferably of 1,200 to 3,000, and a chemical formula $$H(CH_2)_n-O-(CH_2CH_2O)_p-H \qquad \text{(Formula I)}$$

wherein the subscript n is at least 30, preferably in the range of 40 to 60, and the subscript p is at least 10, preferably in the range of 15 to 50. The invention also provides a process for preparing the finish comprising mixing 5 to 20 parts of the ethoxylated alkyl alcohol in a molten condition in 95 to 80 parts of hot water to form an aqueous ethoxylated alkyl alcohol emulsion, and then mixing 10 to 25 parts of the ethoxylated alcohol emulsion with 90 to 75 parts of a second aqueous emulsion which consists essentially of 20 to 50% polydimethylsiloxane and 80 to 50% water. The invention further provides a spandex fiber, preferably a polyether-based spandex fiber, having on its surface, a dry Weight of the finish amounting to 0.5 to 10%, preferably 2 to 5%, of the fiber weight. All parts and percentages are by weight.

DETAILED DESCRIPTION OF PREFERRED EMBODIMENTS

As used herein, the term "spandex" has its usual definition; that is, a long chain synthetic polymer that comprises at least 85% by weight segmented polyurethane. "Molecular weight" means number average molecular weight. "fiber" includes in its meaning staple fibers, continuous filaments and coalesced strands of multiple filaments. All parts and percentages recorded herein are by weight, unless indicated otherwise.

The following description and the examples below are included for the purposes illustrating preferred embodiments of the invention and are not intended to limit its scope, which is defined by the appended claims.

In accordance with the present invention, the new finish comprises 50 to 95% water and 50 to 5% solids. The solids part of the emulsion consists essentially of 80 to 99.5% polydimethylsiloxane and 20 to 0.5% of an ethoxylated alkyl alcohol.

Polydimethylsiloxanes for use in the finish of the invention are available commercially. Preferably, the polydimethylsiloxane is in the form of an aqueous emulsion and has a viscosity of 1 to 1,000 centistokes (0.01 to 10 m²/sec), preferably in the range of 5 to 100 centistokes (0.05 to 1 m²/sec). Such emulsions are sold by Dow Corning, Wacker Silicones, General Electric and others. In this final composition, the finish of the invention contains a relatively large fraction of polydimethylsiloxane. When on the surface of spandex fiber, the polydimethylsiloxane provides the fiber with good hydrodynamic frictional characteristics (i.e., yarn-against-surface friction).

Ethoxylated alkyl alcohols suitable for use in the finish of the present invention are also available commercially, as for example from Petrolite Specialty Polymers Group of Tulsa, Okla. Such ethoxylated alkyl alcohols have the structural formula $$H(CH_2)_n-O-(CH_2CH_2O)_p-H,$$

where n is at least 30, preferably 40 to 60, and subscript p is at least 10, preferably 15 to 50. The ethoxylated alkyl alcohols are nonionic surfactants that are derived from various primary alkyl alcohols. The subscript n represents the average carbon atom chain length. Generally, the ethoxylated alkyl alcohols in accordance with the invention have number average molecular weights of at least 800, preferably in the range of 1,200 to 3,000. The high molecular weight is believed to prevent the ethoxylated alkyl alcohol from being absorbed into the spandex polymer where it would no longer provide desired anti-tack characteristics to the surface of the fiber. For example, stearyl alcohol ethoxylated with 10 moles of ethylene oxide per mole of alcohol (i.e., in the formula above, n=18, p=10 and MW=about 710) can be absorbed to a significant extent into a spandex fiber. In contrast, ethoxylated alkyl alcohols of the invention, having at least 30 carbon atoms in the residue of the alcohol chain (i.e., n=at least 30) are not so readily absorbed. The minimum amount of ethoxylation, represented by subscript p (i.e., the number of moles of ethylene oxide per mole of alcohol) is 10. When p is less than 10, difficulties are often encountered in maintaining the stability of the aqueous emulsion. The aqueous emulsions of the invention are considered to be very stable; they can remain emulsified for many months and are capable of surviving several freeze-thaw cycles.

The weight ratios of polydimethylsiloxane ("PDMS") and ethoxylated alkyl alcohol ("EOAA") in the finish are usually in the range of 99.5/0.5 to 90/10 (i.e., PDMS/EOAA), but preferably are in the range of 99.5/0.5 to 90/10.

A particularly preferred aqueous emulsion finish of the invention contains 15% solids consisting of 97% polydimethylsiloxane and 3% ethoxylated alkyl alcohol, the ethoxylated alkyl alcohol having n=50 and p=16.

Finishes of the invention can be applied to the fiber by conventional techniques and equipment. Sprays, finish rolls, padding, dipping and the like are suitable. Also, for polymers which are spun from polymer solution (e.g., spandex dissolved in dimethylacetamide solvent), the finish can be added to the polymer solution and spun directly with the polymer.

The process for preparing the finishes of the present invention comprises mixing 5 to 20 parts of the ethoxylated alkyl alcohol in a molten condition in 95 to 80 parts of hot water to form an aqueous ethoxylated alkyl alcohol emulsion, and then mixing 10 to 25 parts of the ethoxylated alcohol emulsion with 90 to 75 parts of a second aqueous emulsion which consists essentially of 20 to 50% polydimethylsiloxane and 80 to 50% water. Usually, the ethoxylated alkyl alcohol is heated to a temperature about that is about 5° to 15° C. above its melting point. The molten ethoxylated alkyl alcohol is then slowly poured, with vigorous stirring into hot water, which is conveniently at a temperature in the range of about 75° to 95° C., preferably in a range of 80° to 90° C. Stirring is continued until an fine emulsion is formed. Usually, vigorous mixing for less than about 10 minutes is sufficient. Total stirring time is somewhat dependent on the batch size. The aqueous emulsion of ethoxylated alkyl alcohol can then be cooled to room temperature or maintained can be maintained hot when mixed with the desired desired quantity of polydimethylsiloxane aqueous emulsion. When mixing the two emulsions, low shear stirring of the mixture is preferred to avoid introducing excessive amounts of air into the emulsion.

In the examples below, yarn-to-yarn friction coefficient ($F_s$) is reported for various lubricated spandex yarns. The friction coefficient is measured in accordance with the method of J. S. Olsen, Textile Research Journal, Vol. 39, 31 (1969) for 70 den (77 dtex) spandex filaments, with an input tension of 0.84 gram, a wrap angle of 180 degrees and a filament speed of 0.0016 cm/sec with dry finish on the filaments amounting to 3.5% of the filament weight. A suitable method for measuring average tension and tension transients, if such are desired, is described by Hanzel et al, U.S. Pat. No. 4,296,174, column 4, lines 20-46.

In the preceding description, the invention was illustrated primarily with regard to spandex fiber. The finishes of the invention are particularly useful with polyether-based spandex fibers. Such spandex fibers have a greater need for the finishes of the invention because of their greater tackiness as compared to other spandex fibers, such as polyester-based spandex fibers. However, the finishes of the invention can also find utility with conventional synthetic organic textile fibers, such as those of nylon, polyester and the like.

EXAMPLES

The examples which follow illustrate the preparation and use of finishes of the invention on spandex filaments. The examples demonstrate a clear advantage for using finishes of the invention on spandex filaments. Comparison of these spandex filaments of the invention with such filaments having one of the best commercially used spandex finishes showed the filaments of the invention to have a 25 to 45% lower break frequency in commercial manufacture of single-covered (with nylon) spandex yarn. The results reported in the following examples are believed to be representative but do not constitute all the runs involving the indicated finishes.

EXAMPLE 1

An ethoxylated alkyl alcohol, Unithox ™ 480, of 2,125 number average molecular weight, prepared from a 30 carbon-chain alcohol (n of formula I=30) and containing 40 moles of ethylene oxide per mole of alcohol (p of formula I=40) and having a melting point of about 85° C., was obtained from Petrolite Specialty Polymers Groups of Tulsa, Okla. A 100-gram sample of the ethoxylated alkyl alcohol was heated to about 10° C. above its melting point. The thusly melted sample was added slowly to 1.773 kg of water which had been heated to and maintained at about 88° C. The addition was accompanied by vigorous mixing at high shear. When the addition was completed, heating was stopped, and mixing was continued for about another few minutes (i.e., about 2-5). Then, shear mixing was decreased to a slow rate until the emulsion folded over itself. The slow stirring was continued and the mixture and was cooled at a rate of about 2° C. per minute until the temperature reached about 60° C. and then was cooled more rapidly to about room temperature. The resultant aqueous emulsion contained 5.34% by weight of ethoxylated alkyl alcohol.

A 168.6-gram sample of the 5.35% ethoxylated alkyl alcohol aqueous emulsion of the preceding paragraph was added to 831.5 g of a 10-centistoke polydimethylsiloxane aqueous emulsion (obtained from Dow Corning)

and at low shear with the mixture at 25° C. The resultant aqueous emulsion is a finish of the invention, containing 30% solids, of which 97% is polydimethylsiloxane of 10-centistoke viscosity and 3% is ethoxylated alkyl alcohol.

The finish was applied at a constant rate to a slowly moving 70-den, Type-146C Lycra ® spandex yarn (sold by E. I. du Pont de Nemours and Company) with a syringe having a slotted needle to add 3.5% (dry) weight to the yarn. The 70-denier yarn was used for yarn-to-yarn friction measurements, reported below in Table 1.

The finish was applied at high speed to a second Type-146C Lycra ® yarn. The finish was applied with a conventional finish roll to 40-den filaments as they emerged from a dry-spinning cell at a velocity of about 900 meter/min. The dried finish amounted to 3.5% of the filament weight. These lower-denier filaments were used in the covering tests reported below.

EXAMPLE 2

The procedure for preparing the finish of Example 1 was repeated except for the following minor modifications in quantities and ethoxylated alkyl alcohol employed.

Ethoxylated alkyl alcohol, Unithox ™ 750, having a 1,400 number average molecular weight, prepared from a 50 carbon-chain alcohol (n=50) and containing 16 moles of ethylene oxide per mole of alcohol (p=16) and having a melting point of about 107° C., was employed. A 500-gram sample of molten Unithox ® was combined as in Example 1 with 2 kg of hot water to form an emulsion having 20% solids. A 22.5-gram sample of the emulsion was combined, as in Example 1 with 415.7 g of the Dow Corning 10-centistoke polydimethylsiloxane aqueous emulsion, after which another 61.8 g of water were added to provide a finish of the invention containing 30% solids.

The finish was applied as in Example 1 to 70-den and 40-den Lycra ® spandex filaments.

The results of the friction measurements on the 70-den yarns are compared in Table 1 with an identical yarn which did not have a finish of the invention. The Comparison Sample A had a 3.5% add-on of a finish made in the same way as in Examples 1 and 2 but instead of having a 97/3 polydimethylsiloxane/ethoxylated alkyl alcohol of the invention, had 97/3 polydimethylsiloxane/ethoxylated stearyl alcohol (i.e., n=18, p=10).

TABLE I

| Sample | Yarn-to-yarn Friction $F_s$, Friction Coefficient |
|---|---|
| Example 1 | 0.47 |
| Example 2 | 0.65 |
| Comparison A | 0.69 |

Note that the yarns having finishes in accordance with the invention have lower yarn-to-yarn friction than those made with an ethoxylated alcohol that is outside the invention. Note also that the yarns of the invention do not have such low frictions as to cause them to move or slide to a position in the yarn package that is different from the desired position in which it was originally wound.

The performance in covering operations of yarns of the invention in accordance with Examples 1 and 2 was compared to such yarns having one of the best commercial finishes for spandex filaments on their surface. The commercial finish, Comparison Sample B, was applied to yield a 3.5% dry weight on 40-denier Type-146C Lycra ®. The finish contained 92 parts polydimethylsiloxane, 4 parts polyamylsiloxane and 4 parts magnesium stearate. The covering operation involved a two-week-long test of the yarns on a 160-spindle, OMM 63 Machine (Menogatto, Italy) that single covered the 40-denier spandex yarns from each of 160 different feed packages with 15 to 40 wraps per inch (depending on style) of 20-denier nylon to form covered spandex yarns at an average speed of about 23 meters per minute. The number of broken spandex yarns per million meters of covered yarn produced during the first and second weeks of the test are summarized in Table 2.

TABLE 2

| | Covering Tests Number of Spandex Yarn Breaks per million meters produced | |
|---|---|---|
| Sample | Week 1 | Week 2 |
| Example 1 | 2.7 | 1.6 |
| Example 2 | 1.9 | 1.4 |
| Comparison B | 3.5 | 2.4 |

An important advantage of yarns having finishes in accordance with the invention is demonstrated by the data in Table 2. The reduction in break frequency by about 25 to 45% is clearly of commercial importance.

I claim:

1. An aqueous emulsion finish, particularly suited for use on spandex fibers, comprising 50 to 95 weight percent water and 50 to 5 percent solids, the solids consisting essentially of 80 to 99.5% polydimethylsiloxane and 20 to 0.5% of an ethoxylated alkyl alcohol having a number average molecular weight of at least 800, and a chemical formula $$H(CH_2)_n-O-(CH_2CH_2O)_p-H$$

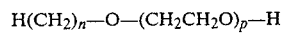

wherein the subscript n is at least 30 and the subscript p is at least 10.

2. An aqueous finish in accordance with claim 1 wherein the molecular weight is in the range of 1,200 to 3,000, n is in the range of 40 to 60, and p is in the range of 15 to 50.

3. A process for preparing a finish in accordance with claim 1 comprising mixing 5 to 20 parts of the ethoxylated alkyl alcohol in a molten condition in 95 to 80 parts of hot water to form an aqueous ethoxylated alkyl alcohol emulsion, and then mixing 10 to 25 parts of the ethoxylated alcohol emulsion with 90 to 75 parts of a second aqueous emulsion which consists essentially of 20 to 50% polydimethylsiloxane and 80 to 50% water.

4. A spandex fiber having on its surface, a dry weight of a finish in accordance with claim 1 amounting to 0.5 to 10% of the fiber weight.

5. A spandex fiber in accordance with claim 4 wherein the dry finish amounts to 2 to 5% of the fiber weight.

6. A spandex fiber of claim 4 or 5 wherein the spandex is a polyether-based spandex.

* * * * *